United States Patent [19]

Gaines

[11] Patent Number: 5,184,716
[45] Date of Patent: Feb. 9, 1993

[54] VIBRATORY FEEDER

[75] Inventor: Jefferson J. Gaines, Tucson, Ariz.

[73] Assignee: Arizona Gear and Manufacturing, Tucson, Ariz.

[21] Appl. No.: 722,300

[22] Filed: Jun. 27, 1991

[51] Int. Cl.⁵ .................................................. B65G 27/08
[52] U.S. Cl. ..................................... 198/763; 198/771
[58] Field of Search ......................... 198/763, 769, 771

[56] References Cited

U.S. PATENT DOCUMENTS

| | | | |
|---|---|---|---|
| 2,832,464 | 4/1958 | Smith | 198/769 |
| 3,025,944 | 3/1962 | Sloan et al. | 198/771 |
| 3,786,912 | 1/1974 | Taylor | 198/769 |
| 4,146,123 | 3/1979 | Cottrell | 198/771 |

FOREIGN PATENT DOCUMENTS

| | | | |
|---|---|---|---|
| 2600048 | 12/1987 | France | 198/763 |
| 613972 | 7/1978 | U.S.S.R. | 198/771 |
| 394503 | 6/1933 | United Kingdom | 198/769 |

Primary Examiner—Joseph E. Valenza
Attorney, Agent, or Firm—Richard R. Mybeck

[57] ABSTRACT

A vibratory feeder for in-line transportation of small electronic parts having a base mounted vibrator subassembly for importing controllable rectilinear movement to parts disposed with a channelled deck superposed thereto and deliver such parts reliably and uniformly to a pick point defined therein. The vibrator sub-assembly includes an upper and lower plate having a magnetic vibrator and a plurality of cylindrical springs operatively interposed therebetween.

9 Claims, 1 Drawing Sheet

VIBRATORY FEEDER

INTRODUCTION

The present invention relates generally to new delivery assistance and more particularly to a vibratory feeder specially adapted for surface mount electronic application.

BACKGROUND OF THE PRESENT INVENTION

The recent growth of miniaturization in the electronic field has given rise to a need for self contained units which are ready to mount into an existing work envelope or for use in pick and place machinery and robotic work stations whenever and wherever reliable parts delivery is required. In addition to providing steady and dependable delivery of parts to a given work site, it is extremely important that the part be correctly oriented and strategically aligned so that it can properly interface with other systems including pick and place machinery and like robotics to ensure that each part is where it should be when it should be and arrives oriented as it should be so that preset scheduling of an efficient production line can be maintained.

One of the major problems in existing vibratory feeders, particularly those intended for use in automatic pick up or robotic works cells in the assembly of integrated circuit boards and like electronic applications, is the frequent misorientation or misalignment of critical parts and the general lack of reliability present in existing machines.

Accordingly, a serious need exists in industrial assembly lines and particularly those line integrated surface model electronic applications for a new and improved device which can enhance the reliability and dependability of such machines and enable them to contribute to the overall efficiency of the assembly production line.

One of the serious disadvantages of the prior vibratory feeders which have been prepared with flat steal springs arises from their inability to control the machine and orient the surface mounted components. Flat springs as designed provide for radial movement and create excessive activity in a situation where linear activity is all that is required or desired. It has been further found and will hereinafter appear in greater detail that the device of the present invention is directed not only to the solution of the prior art pattern problems but provides a reliability and exactness heretofore unobtainable by prior art devices.

BRIEF SUMMARY OF THE INVENTION

The present invention is based upon a unique design of vibratory feeder for in line transportation of small electronic parts and the like, such as those used in surface mountable electronic application in which the mechanical harmonics of the means for transporting individual parts is harmonized to provide movement created less on force and with more reliability and consistency. More particularly, the present invention provides an in-line vibratory feeder for small parts including a base means, an elongated channel means disposed in spaced relationship to the base means having elongated cylindrical springs means operatively interposed between the base means and channel means to support the channel means relative to base means and defining an interior angle of from about 5° to about 85° therebetween. A magnetic coil is employed to selectively flex the spring means and impart forward motion only to the small parts disposed in the channel and is selectively actuable to energize the magnetic means to provide impulse movement to the small parts in the channel.

Accordingly, a principal object of the present invention is to provide a new and improved in-line vibratory feeder having improved reliability in the delivery and orientation of the small parts transported thereby.

Another object of the present invention is to provide a new and improve linear feeder adapted for coaction with anti-static tube feeders in automated service mount electronic assemblies to provide pick point tolerance and uniform delivery.

These and still further objects as shall hereinafter appear are readily fulfilled by the present invention in a remarkably unexpected manner as will be readily discerned from the following detailed description of an exemplary embodiment thereof especially when read in conjunction with the accompanying drawing in which like parts bear like numerals throughout the several views.

DESCRIPTION OF PREFERRED EMBODIMENTS

Figure 1:
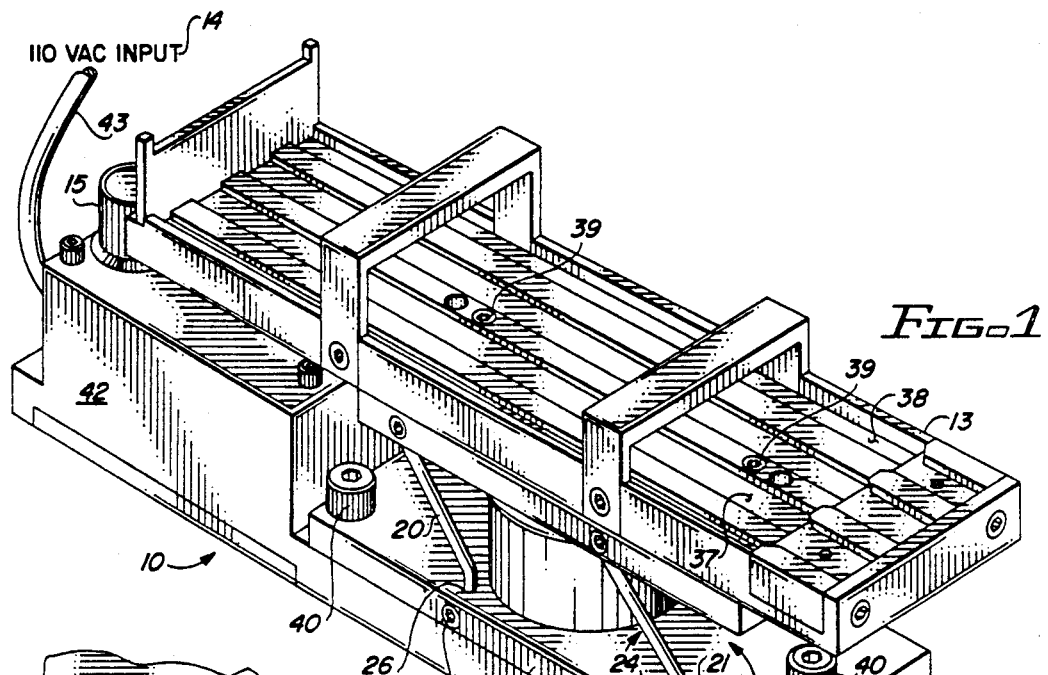
FIG. 1 is an isometric showing of a vibratory feeder embodying the present invention.
Figure 3:
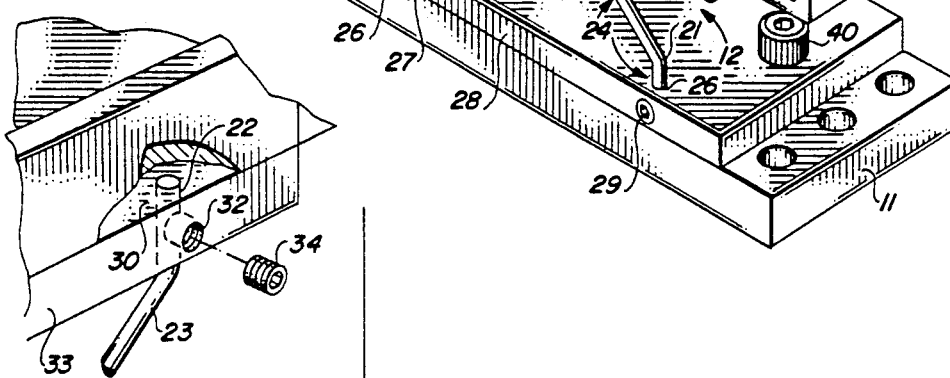
FIG. 3 an enlarged fragmented view of the area designated "3" in FIG. 2.

The vibratory feeder of the present invention is identified by the general reference 10 and, as shown in FIGS. 1 and 3, comprises a base member 11, a magnetic vibrator sub-assembly 12 seated upon said base member 11 and supporting on upper deck member 13 thereupon. Vibrator sub-assembly 12 is actuatable in response to a conventional power source 14 which passes through a conventional rheostat 15 to control and effect the magnitude of the vibrations generated thereby.

Magnetic vibrator sub-assembly 12 comprises an upper plate 17, a lower plate 18 and a magnetic vibrator 19 sandwiched therebetween. Four cylindrical springs 20 are operatively interposed between upper plate 17 and an lower plate 18 as will appear, function to control and transmit reciprocating rectilinear movement from vibrator 19.

Each cylindrical spring 20 comprises a vertically extending foot portion 21 and vertically extending head portion 22 interconnected by and integrally formed with body portion 23. Body portion 23 defines an interior angle 24 with foot portion 21 and head portion 22 which ranges between from about 5° to about 85° depending upon the size and weight of the item being delivered thereby.

A plurality of sockets 26, are defined adjacent each edge of lower plate 18, each being configured to receive a foot portion 21 of a discrete spring 20 snugly therewithin. A lateral extending threaded bore 27 is drilled into the side 28 of lower plate portion 18 adjacent each socket 26 to receive a threaded lock nut 29 therewithin to engage and secure spring 20 within its respective socket 26. A similar arrangement of bores 27 and nuts 29 are provided on the opposite side of lower plate 18 so that the pair of fore sockets and the pair of aft sockets are, respectively, in transverse alignment with each other.

Upper plate 17 has a plurality of like sockets 30 strategically disposed in the under surface 31 thereof to provide a pair of fore sockets and a pair of aft sockets, each pair being disposed in transverse alignment with each other. Each socket 30 is adapted to receive and secure the head portion 22 of a different one of the several spring members 20. Each socket member 30 is also provided with a threaded bore 32 drilled into the side 33 of upper plate 17 in communication with socket 30 for receiving a threaded lock nut 34 therewithin to engage and secure head portion 22 thereinto.

Deck member 13, as shown in FIG. 1, comprises a plurality of parallel channels 37, 38 which are custom sized to conform to a particular component carrier such as an aluminum rail magazine, an anti-static tube or the like (not shown).

In a preferred embodiment, deck member 13 is interchangeable, depending upon the component being fed, and is secured to the upper plate 17 of the magnetic drive sub-assembly 12 by suitable bolts 39.

Figure 2:
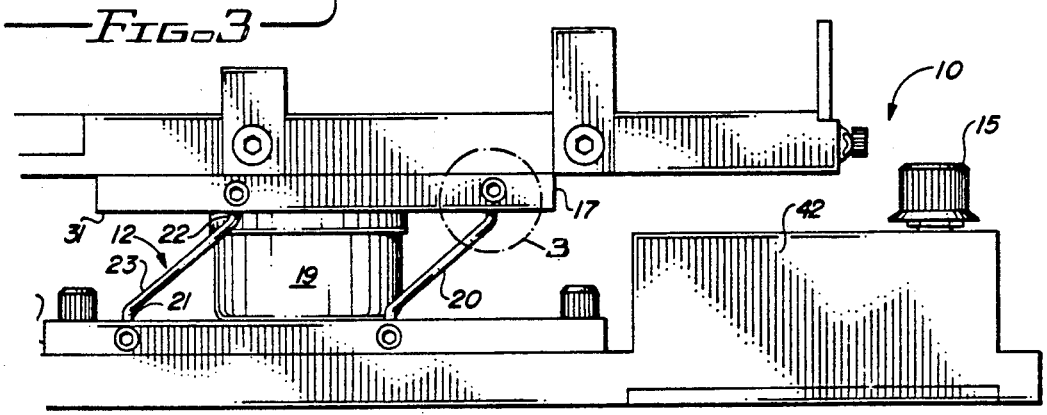
FIG. 2 is a side elevation of the vibratory feeder of FIG. 1.

Referring to FIGS. 1 and 2, device 10 is assembled in the following fashion. First, magnetic drive sub-assembly 12 is assembled by mounting four cylindrical springs 20 into lower plate 18. Next, the lock nut 29 for each socket 26 is inserted into the corresponding threaded bore 27 and tightened until each spring 16 is locked and secured in its predetermined location.

Next, magnetic vibrator sub-assembly 12 is prepared by securing vibrator 19 to the operative center of lower plate 18 and upper plate 17, which contains for an aft socket members 30 in the lower surface 31 thereof, each in registry with a corresponding head portion 22 of springs 20, is fitted onto the several head portions 22. Lateral threaded bores 32 are disposed, a pair in each side of upper plate 17 so that each extends into a communication with a separate socket member 30. Threaded lock nuts 34 are then inserted into and tightened into engagement with the respective head portions 22 to tightly secure the spring members 20 to upper plate 17, as shown in FIG. 3, and upper plate 17 is held in intimate surface engagement with magnetic vibrator 19.

The vibrator sub-assembly 12 is next mounted to base member 11 with suitable fasteners 40. Upper deck 13, chosen for the particular part to be processed is then secured to upper plate 17 in planar engagement therewith by suitable fasteners 39.

Power regulator 42 is secured to base member 11 adjacent one end thereof and is connected to a suitable power source by cord 43. Rheostat control means 15 is adjustable to control the magnitude of the vibrations emanating from vibrator assembly 12 to achieve a smooth and uniform flow of components in channels 37, 38.

From the foregoing, it is readily apparent that a useful embodiment of the present invention has been herein described and illustrated which fulfills all of the aforestated objectives in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly, what is claimed is:

1. A vibratory feeder for delivering small parts in-line comprising: a base member; a vibratory sub-assembly mounted upon said base member; an upper-deck member mounted upon said sub-assembly and responsive thereto, said upper-deck member being adapted to support a plurality of small parts thereon; cylindrical spring means operatively interposed between said base member and said upper-deck member to support said upper-deck member, each said cylindrical spring means having an elongated cylindrical body portion, a head portion and a foot portion, said body portion defining an interior angle with said foot portion of from about 5° to about 85°, said head portion extending generally normal to said upper deck member for attachment to said vibrator sub-assembly; and power means operatively associated with said vibrator sub-assembly and selectively actuable to impart forward motion to each of said small parts disposed upon said upper-deck member through said cylindrical spring means.

2. A vibratory feeder according to claim 1 in which said upper-deck member comprises a plurality of elongated channels disposed in spaced generally parallel relationship to each other and adapted to contain said small parts therein.

3. A vibratory feeder according to claim 1 in which said vibratory sub-assembly comprises an upper plate, a lower plate, and a power activated magnetic vibrator operatively interposed therebetween which, when activated, transmits forward motion to said upper-deck member through said cylindrical spring means.

4. A vibratory feeder according to claim 1 having a power regulator operatively interposed between said power means and said vibratory sub-assembly.

5. A vibratory feeder according to claim 3 in which said upper-deck member comprises a plurality of elongated channels disposed in spaced generally parallel relationship to each other and adapted to contain said small parts therein.

6. A vibratory feeder according to claim 3 in which said cylindrical spring means operatively interconnect said upper plate and said lower plate and transpose output from said magnetic vibrator into said forward motion of said small parts.

7. A vibratory feeder according to claim 6 in which said head portion extends generally normal to said upper plate and said foot portion extends generally normal to said lower plate, each said portion being detachably secured to said corresponding plate within said vibrator sub-assembly.

8. A vibratory feeder according to claim 7 in which said upper-deck member comprises a plurality of elongated channels disposed in spaced generally parallel relationship to each other and adapted to contain said small parts therein.

9. An in-line vibratory feeder for small parts comprising: base means; elongated channel means disposed in spaced relationship to said base means and adapted to contain small parts therein; cylindrical spring means operatively interposed between said base means and said channel means for supporting said channel means relative to base means, said spring means having an elongated cylindrical body portion, a head portion, and a foot portion and defining an interior angle with said base means of from about 5° to about 85°, said head portion extending generally normal to said channel means and said foot portion extending generally normal to said base means; magnetic vibrator means operatively interposed between said channel means and said base means and adapted to selectively flex said spring means and impart forward motion to said small parts disposed in said channel means; and power means operative to selectively energize said magnetic vibrator means.

* * * * *